United States Patent Office 3,409,691
Patented Nov. 5, 1968

3,409,691
POROUS CATION EXCHANGE RESINS AS SELECTIVE SORBENTS IN ORGANIC SYSTEMS
Hamish Small, Midland, Mich., assignor to The Dow Chemical Company, Midland, Mich., a corporation of Delaware
No Drawing. Filed Feb. 1, 1966, Ser. No. 523,920
10 Claims. (Cl. 260—676)

ABSTRACT OF THE DISCLOSURE

Selective absorption of polar organic species from a nonaqueous liquid or gaseous mixture with a less polar species is obtained using a dry macroporous cation-exchange resin as a selective sorbent. The process is particularly suitable for removing small amounts of a polar impurity from an aliphatic hydrocarbon.

---

New techniques applicable to the refining of petroleum products are widely sought. The separation of saturated and unsaturated hydrocarbons by formation of silver-olefin complexes with aqueous silver nitrate has been modified by the use of a weak-base anion-exchange resin in silver or copper form as the sorbent in the process described by Thomas in U.S. Patent 2,865,970. Recently Niles described in U.S. Patent 3,219,717 the separation of olefins using a conventional cation-exchange resin in heavy metal salt form. Such selective sorbents also have wide use in chemical analysis.

An improved process has now been discovered for the separation of a polar organic species from a less polar species in a nonaqueous liquid or gaseous mixture by using as the selective sorbent a dry macroporous cation-exchange resin. This process achieves an unexpected and highly significant increase in sorbent capacity, selectivity and efficiency even though there is no appreciable increase in the ion-exchange capacity of the macroporous cation-exchange resin. A critical factor in this process is the coupling of the greater porosity of the cation-exchange resin with the selective solvation of the counter-ions within the resin matrix. These results are obtained by using a macroporous cation-exchange resin having a specific surface area of at least 20 m.$^2$/g. as measured by standard nitrogen absorption.

Macroporous cation-exchange resins

Recent discoveries in polymerization techniques have produced a new type of crosslinked ion-exchange resin characterized by a novel macroporous structure. These macroporous resins contain a significant nongel porosity clearly revealed by electron microscopy and mercury porosimetry. It is further evident in the specific surface area of the resin measured by nitrogen absorption. For example, conventional cation-exchange resins such as Amberlite IR–120 resin, Dowex 50 resin and Permutit Q resin in the dry 20–50 mesh sodium form have a specific surface area of less than 0.1 m.$^2$/g. by nitrogen absorption. In contrast a macroporous cation-exchange resin with a similar exchange capacity may have a specific surface area of 20–400 or more m.$^2$/g. Such resins are required herein.

Macroporous cation-exchange resins are normally prepared by incorporating cation-exchange groups into an insoluble cross-linked macroporous resin matrix. For example, a strong-acid resin with a specific surface area greater than 20 m.$^2$/g. can be obtained by sulfonation of a macroporous styrene-divinylbenzene resin. Commercial macroporous cation-exchange resins suitable for this process include Amberlyst 15, Amberlyst XN–1005 and Amberlite IR–200 resins from Rohm and Haas which have an ion-exchange capacity between about 3.5–5.0 meq./g. dry Na$^+$ resin. Other macroporous cation-exchange resins are described by Kressman and Millar in British Patent 889,304.

The intermediate macroporous polymers can be prepared by polymerization of a variety of monomers including styrene, chlorostyrene, vinyltoluene isopropylstyrene, divinylbenzene, divinyltoluene ethyl acrylate, vinyl acetate, ethylene glycol dimethacrylate, etc., under conditions which yield a macroporous resin. An important factor usually is a diluent which is a good solvent for the monomer but not the polymer or copolymer. Particularly suitable diluents for preparing a macroporous styrene divinylbenzene copolymer are C$_4$–C$_{10}$ alcohols such as n-butanol, t-amyl alcohol and n-decanol, C$_7$–C$_{10}$ aliphatic hydrocarbons including n-heptane and isooctane, and aromatic hydrocarbons such as benzene, toluene or ethylbenzene as well as mixtures of these diluents. Alternate procedures for preparing a macroporous polyvinylaromatic resin are described by Amos in U.S. Patent 2,537,951 and in British Patent 980,229.

The macroporous structure of an intermediate resin can be retained during incorporation of sulfonic acid, carboxylic acid, or other cation-exchange groups required in the present process. Further details are given in the art including Kressman and Millar U.S. Patent 3,147,214, Fang and Fiarman U.S. Patent 3,201,357 and British Patents 860,695, 894,391, 898,304 and 973,971.

Normally macroporous cation-exchange resins are produced in the sodium form and have about the same total ion-exchange capacity as conventional cation-exchange resins, e.g., about 3.0–5.0 meq./g. dry Na$^+$ resin. Other cationic forms are readily prepared as required by standard ion-exchange techniques.

For use in the present non-aqueous process, the macroporous cation-exchange resin must be substantially water-free, i.e., contain less than 1–2 weight percent and preferably less than 0.2 weight percent water. Such a resin can be obtained by conventional azeotropic or vacuum drying.

Because of the macroporous structure, the specific surface area of the resin is not greatly affected by the resin particle size. Thus the gross particle size of the resin is not extremely critical. For batch and column operation a 20–40 mesh macroporous resin is convenient.

Selective sorption

Separations by the improved process entail selective extraction of a polar species from a less polar species in the nonaqueous liquid or gaseous mixture. Typically an alcohol or amine can be removed from an ether or hydrocarbon; traces of acetylene or phenol can be removed from air; a ketone or mercaptan can be removed from an aromatic hydrocarbon; an olefin or diolefin can be removed from a saturated hydrocarbon. The process has broad versatility and utility.

The selectivity of the process is critically influenced by the nature of the macroporous resin counterion. The usual sodium form is quite suitable for some separations. But no one cationic form is equally useful in all applications. For example, a copper or silver form is often most selective for removing a trace quantity of olefin from an aliphatic hydrocarbon. At times a free acid resin is preferred. The best cationic form for a particular separation can be determined by simple tests as shown below.

The mechanism of the selective extraction is not known in detail. It clearly involves preferential solvation of the resin cations by the more polar organic species, e.g., by a species able to share an electron pair with an unsolvated resin cation. In some instances formation of a true complex between the polar species and the cation is evident.

Sorption of the more polar species is not critically dependent upon its concentration in the mixture. Yet the process is particularly useful in removing relatively small amounts of a polar impurity from a mixture with a less polar liquid or gas, e.g., for removal of 1 percent or less of acetylene from air or 200 p.p.m. of ethylene from n-hexane. Because of the efficiency and capacity of the macroporous resin sorbents, a polar impurity can often be rapidly removed to a residual concentration of 1–5 p.p.m. or less.

Operating conditions

In operation the liquid or gaseous feed mixture is intimately contacted with the macroporous cation-exchange resin in the desired cationic form at a temperature and pressure suitable for sorption of the more polar species. Batch and continuous operations with fixed or fluid resin beds can be used. Optimum conditions will depend on such factors as the nature and concentration of the feed components as well as, the cationic form of the macroporous resin.

Among the process variables, the operating temperature and contact time are particularly important. In general as long as the components remain gaseous or liquid, the process can be operated at any suitable temperature within the limits of the resin stability. Some separations, such as the removal of an olefin form a hydrocarbon or acetylene from air with a macroporous resin in silver form, are effectively carried out at 0° C. or less provided the components individually or mixed do not solidify. In the absence of oxygen, a macroporous sulfonated styrene-divinylbenzene resin in sodium form can be used in separations at 160–200° C.

Because of the porous structure of the resin, sorption is generally rapid. To remove a low concentration of a polar species from a gaseous hydrocarbon stream with a fixed resin bed, flow rates of 5 to 100 or more bed volumes per minute can often be used. Longer contact times generally are desirable with more concentrated gaseous or liquid mixtures.

Normally the process operates at atmospheric pressure, but elevated or reduced pressures can be used as required. Indeed a change in pressure as well as temperature and feed mixture is often advantageous in regenerating a used or exhausted resin.

Sorption of the more polar species by the macroporous cation-exchange resin is usually clean and rapid until the capacity of the resin is nearly exhausted. Breakthrough in column operation particularly with liquid mixtures is sharp. By appropriate control of sorption conditions, diversion of the feed or product stream to other units, recycling and other conventional techniques, mixtures containing a variety of polar species can be separated into fractions of high purity. Regeneration of used or exhausted resin is usually achieved by contacting the resin with a purge stream often with a concurrent increase in temperature. At times reduced pressure facilitates regeneration.

Within the general scope of this invention, the preferred macroporous cation-exchange resin and optimum operating conditions can be determined by those skilled in the art. To illustrate further the present invention, the following examples are given. Unless otherwise stated, all parts and percentages are by weight. The mercury porosity measurements of the resins were made by the method of Frevel and Kressley, Anal. Chem., 35, 1492 (1963), and specific surface area is determined from the nitrogen absorption isotherm at the temperature of liquid nitrogen using the standard Brunauer, Emmett and Teller method (BET method).

EXAMPLE 1

Macroporous cation-exchange resins (A) A solution of 40 parts of a mixture containing 55 percent divinylbenzene, 43 percent ethylvinylbenzene and 2 percent diethylbenzene in 1600 parts of diethylbenzene together with 2.5 parts of benzoyl peroxide, 1.0 part of azobisisobutyronitrile, 2.5 parts of benzoin and 0.5 part of ceric naphthenate was suspended in 4500 parts of water containing 25 parts of carboxymethyl cellulose and 3.0 parts of potassium dichromate. Polymerization for 4 hrs. at 50° C., 12 hrs., at 70° C. and 80 hrs., at 90° C, gave a slurry of fine polyvinylaromatic resin beads. After thorough washing and centrifuging 1850 parts of wet 100–200 mesh macroporous copolymer beads containing about 80 percent water was obtained. A sample dried in vacuo at 70°–80° C. for 16 hrs. had a specific surface area of 700 m.$^2$/g. by the nitrogen absorption BET method.

A slurry of 1000 parts of the wet macroporous beads in 3000 parts of methylene chloride was stirred for 40 min. at room temperature to displace absorbed water and diethylbenzene. The liquid phase was removed and the resin equilibrated 3 more times with methylene chloride before adding a solution of 600 parts of chlorosulfonic acid in 3000 parts of methylene chloride. Sulfonation was carried out for 4 hours at about 35° C. before being quenched with water. The sulfonated beads were recovered and washed thoroughly with water. The wet macroporous cation-exchange resin had a capacity of 0.544 meq./g. $H^+$ form and a water content of 82.6 percent.

A quantity of the wet resin was converted to the sodium form by treatment with 25 percent NaOH followed by washing with water and methanol. The resin was air dried at 80° C. and then in vacuo at 95° C. for 16 hours. The dry sulfonated resin in $Na^+$ form had a capacity of 3.01 meq./g. and a specific surface area of 322 m.$^2$/g. by the nitrogen absorption BET method. Its porosity by the mercury porosimeter was 68.6 percent.

(B) In another run using essentially the same procedure a 50–100 mesh copolymer was obtained having a specific surface area of 505 m.$^2$/g. Sulfonation gave a macroporous cation-exchange resin having in dry $Na^+$ form an exchange capacity of 3.51 meq./g., a specific surface area of 334 m.$^2$/g. and a porosity of 70.0 percent.

(C) A commercial macroporous cation-exchange resin (Amberlite IR–200 resin from Rohm and Haas) was found to have a capacity of 4.18 meq./g., a specific surface area of 61.4 m.$^2$/g., and a porosity of 37.2 percent in dry $Na^+$ form.

EXAMPLE 2

Removal of butyl alcohol from n-hexane (A) A small ion-exchange column was loaded with 5.26 g. (9.6 ml.; 15.8 meq.) of the dry macroporous cation-exchange resin, $Na^+$ form, described in Example 1A. Sufficient n-hexane was added to cover the resin. Then a solution of 500 p.p.m. sec-butyl alcohol in n-hexane was fed into the top of the column at a constant rate of about 1 ml./min.

The effluent from the column was periodically sampled and the effluent concentration of sec-butyl alcohol measured by vapor phase chromatography.

A parallel experiment was run using 5.26 g. (6.2 ml., 25.2 meq.) of Dowex 50W–X1 $Na^+$ resin, a conventional lightly cross-linked resin having an exchange capacity of 4.8 meq./g. and a specific surface area of <0.1 m.$^2$/g. as a dry $Na^+$ resin.

As shown in Table 1, more than 180 bed volumes of the 500 p.p.m. sec-BuOH solution passed through the macroporous cation-exchange resin column with sorption of at least 7.7 meq. of alcohol before any significant amount of alcohol was detected in the effluent. In contrast breakthrough occurred with the conventional resin after less than 2 bed volumes of feed.

TABLE 1.—COLUMN SORPTION OF sec-BuOH (500 p.p.m. IN n-HEXANE)

| Macroporous Na+ Resin (322 m.²/g.) | | Conventional Na+ Resin (<0.1 m.²/g.) | |
|---|---|---|---|
| Bed Vol. | $C_E/C_F$ a | Bed Vol. | $C_E/C_F$ a |
| 170 | <0.01 | 1.6 | 0.39 |
| 182 | 0.034 | 3.2 | 0.50 |
| 190 | 0.12 | 4.8 | 0.69 |
| 198 | 0.21 | 6.4 | 0.75 |
| 208 | 0.41 | 8.0 | 0.77 |
| 216 | 0.61 | 17.7 | 0.82 |
| 224 | 0.75 | 27.4 | 0.88 |
| 232 | 0.83 | 32.2 | 0.89 | a $C_E$=effluent concentration; $C_F$=feed concentration.

(B) The loaded macroporous resin shown in Table 1 was rinsed with 5 percent methanol in n-hexane. Less than 12 bed volumes were required to displace the sorbed sec-BuOH. Heating overnight at 110° C. in a vacuum oven removed the methanol and regenerated the column. When tested again with the 500 p.p.m. sec-BuOH solution, no significant amount of sec-BuOH was found in the effluent until after 178 bed volumes were treated ($C_E/C_F$=0.017).

(C) In another experiment columns containing about 5 g. of the three macroporous cation-exchange resins described in Example 1 were loaded with a 2000 p.p.m. solution of n-BuOH in n-hexane at a flow rate of about 10 ml./min. Breakthrough curves were obtained for each resin and the amount of sorbed n-BuOH determined. Results are shown in Table 2.

TABLE 2.—COLUMN SORPTION OF n-BuOH (2,000 p.p.m. IN n-HEXANE)

| Macroporous Resin | Capacity | Sp. Surface Area | Sorbed n-BuOH |
|---|---|---|---|
| 1A | 3.01 meq./g. | 322 m.²/g. | 0.21 g./g. resin. |
| 1B | 3.51 meq./g. | 334 m.²/g. | Do. |
| 1C | 4.18 meq./g. | 61.4 m.²/g. | 0.05 g./g. resin. |

(D) To obtain data on batch sorption, 1–2 g. samples of resin in Na+ form were shaken separately with 100 ml. of the 500 p.p.m. sec-BuOH solution in n-hexane at room temperature. The hexane phase was periodically analyzed for residual sec-BuOH. Typical results showing more effective sorption by the macroporous resins are given in Table 3.

TABLE 3.—BATCH SORPTION OF sec-BuOH (500 p.p.m. IN n-HEXANE)

| Resin | Sp. Area | Residual sec-BuOH, p.p.m. | | | | | |
|---|---|---|---|---|---|---|---|
| | | Init. | 1 min. | 4 mins. | 10 mins. | 30 mins. | 18 hrs. |
| Macroporous Resin 1A | 322 m.²/g. | 500 | 120 | 18 | 1 | <1 | |
| Macroporous Resin 1C | 61.4 m.²/g. | 500 | 340 | 300 | 1 221 | 210 | 85 |
| Dowex 50W-X1 | <0.1 m.²/g. | 500 | 500 | 500 | 500 | 500 | 500 |

1 After 13 minutes.

EXAMPLE 3

Selective liquid phase sorption

To screen the selectivity of the macroporous cation-exchange resins in different cationic forms, liquid phase distribution coefficients were determined by equilibrating a weighed sample of dry resin (about 0.5 g.) with 5 ml. of a test mixture containing 0.01–0.05 g./ml. of polar solute in a less polar solvent, usually n-hexane. After equilibration by shaking for 20 hours at room temperature, the liquid phase was analyzed for residual solute. Then an equilibrium distribution coefficient ($K_D$) is calculated from the initial and equilibrium solute concentrations using the formula:

$$K_D = \frac{(C_o - C_e)V}{C_e W}$$

where
$C_o$=initial solute concentration (g./ml.),
$C_e$=equilibrium solute concentration (g./ml.),
$V$=solution volume (ml.), and
$W$=resin weight (g.).

Samples of the macroporous cation-exchange resin described in Example 1A were converted by ion-exchange into the desired cationic forms and then thoroughly dried. Typical results from such equilibrium experiments with n-hexane as the less polar species are given in Table 4.

TABLE 4.—LIQUID PHASE DISTRIBUTION COEFFICIENTS WITH MACROPOROUS CATION-EXCHANGE RESIN

[322 m.²/g. Na+ form]

| Cationic form | $K_D$, Solute, $C_O$ (g./ml.) | | | | | | |
|---|---|---|---|---|---|---|---|
| | n-PrOH 0.01 | n-PrOH 0.04 | MEK 1 0.01 | n-Bu₂O 0.03 | n-C₃H₇CHO 0.01 | i-BuSH 0.01 | Thiophene 0.01 |
| H+ | >620 | 41.8 | 48.5 | 4.72 | >495 | | |
| Li+ | >870 | 27.9 | 423 | 3.54 | 96.5 | 6.7 | 1.2 |
| Na+ | >850 | 17.3 | 172 | 2.84 | 147 | 8.9 | 2.3 |
| Mg+2 | >900 | 23.2 | 417 | 1.97 | 197 | 2.7 | 1.2 |
| Ba+2 | >580 | 15.1 | 234 | 2.08 | | | |
| Zn+2 | >730 | 27.7 | 48.5 | 1.55 | 339 | 14.1 | <0.1 |
| UO₂+2 | >750 | 10.8 | 55.2 | 1.41 | >272 | 4.8 | 1.2 |
| Mn+2 | >920 | 16.4 | 110 | 1.58 | 345 | 6.6 | 0.8 |
| Co+2 | >650 | 44.6 | 94 | 2.40 | >266 | 23.7 | 0.4 |
| Fe+2 | >810 | 26.5 | 165 | 1.80 | 347 | 17.2 | <0.1 |
| Ni+2 | 403 | 6.1 | 41 | 1.00 | >312 | 26.4 | 0.7 |
| Cu+2 | >507 | 42.0 | 35 | 1.61 | >288 | >476 | 1.4 |
| Fe+3 | >790 | 12.8 | 51 | 1.20 | >378 | 84 | 1.9 |
| Cr+3 | 420 | 5.6 | 33 | 0.89 | >330 | 3.7 | 2.9 |
| Al+3 | 276 | 10.2 | 39.4 | 2.35 | >271 | | |
| Ce+4 | 425 | 8.8 | 167 | 1.64 | >313 | 5.3 | 5.9 |
| Ag+ | 256 | 9.6 | 21.7 | 1.24 | 57.4 | >546 | 13.0 |

1 Methyl ethyl ketone.

(B) When this test was applied to a sample of the macroporous resin in Li+ form using a 1 percent solution of methanol in n-butyl ether, no residual methanol could be detected after 0.5 hour.

The different selectivity of the various cationic forms is evident. In general the free acid and alkali metal salt forms are particularly effective in removing traces of oxygen containing solutes from hydrocarbons while a copper salt is preferred for removing a mercaptan. The silver salt is particularly effective for absorbing traces of unsaturated aromatic hydrocarbons.

EXAMPLE 4

Liquid phase column sorption (A) Selective column sorption is readily studied using small ion-exchange columns loaded with dry macroporous cation-exchange resin in an appropriate cationic form. Data given in Table 5 on breakthrough curves for a number of polar species removed from n-hexane were obtained using about 5 g. of dry resin described in Example 1A and a feed rate of about 1 ml./min. A relatively sharp breakthrough is obtained with a macroporous cation-exchange resin as sorbent.

polar solutes were injected into the carrier stream and the point of solute appearance in the eluent stream determined.

(A) Typical results with a $Co^{+2}$ and an $Ag^+$ resin are given in Table 6 using arbitrary chart units to indicate the relative peak locations. No attempt was made to determine optimum operating conditions.

TABLE 5.—BREAKTHROUGH CURVES WITH n-HEXANE SOLUTIONS AND MACROPOROUS CATION-EXCHANGE RESIN

[322 m.²/g. Na⁺ form]

| Run 4-1 | | Run 4-2 | | Run 4-3 | | Run 4-4 | | Run 4-5 | |
|---|---|---|---|---|---|---|---|---|---|
| H⁺ Resin 2% n-BuOH | | H⁺ Resin 0.5% n-BuOH | | H⁺ Resin 0.2% n-BuOH | | H⁺ Resin 1% n-BuOH | | Ni⁺² 1% n-BuOH | |
| Bed Vol. | $C_E/C_F$¹ | Bed Vol. | $C_E/C_F$ | Bed Vol. | $C_E/C_F$ | Bed Vol. | $C_E/C_F$ | Bed Vol. | $C_E/C_F$ |
| 10.6 | ~0 | 32.8 | ~0 | 66.3 | ~0 | 19.8 | ~0 | 11.1 | ~0 |
| 11.0 | 0.0158 | 33.6 | 0.01 | 67.0 | 0.0425 | 20.4 | 0.019 | 11.6 | 0.151 |
| 11.7 | 0.565 | 34.5 | 0.40 | 68.5 | 0.224 | 20.9 | 0.484 | 12.1 | 0.405 |
| 12.2 | 0.935 | 35.4 | 0.79 | 70.0 | 0.565 | 21.4 | 0.766 | 12.6 | 0.735 |
| 12.7 | 1.0 | 36.2 | 0.965 | 70.8 | 0.74 | 21.9 | 1.0 | 13.2 | 0.80 |
| | | 37.1 | 0.995 | 73.8 | 0.92 | | | 18.4 | 0.92 |

| Run 4-6 | | Run 4-7 | | Run 4-8 | | Run 4-9 | | Run 4-10 | |
|---|---|---|---|---|---|---|---|---|---|
| H⁺ Resin 1% n-Bu₂O | | H⁺ Resin 0.5% n-Bu₂O | | Fe⁺³ Resin 1% n-Bu₂O | | Li⁺ Resin 1% MEK | | Al⁺³ Resin 1% MEK | |
| Bed Vol. | $C_E/C_F$ | Bed Vol. | $C_E/C_F$ | Bed Vol. | $C_E/C_F$ | Bed Vol. | $C_E/C_F$ | Bed Vol. | $C_E/C_F$ |
| 5.4 | ~0 | 10.4 | 0.0236 | 1.68 | ~0 | 6.1 | 0.025 | 2.95 | ~0 |
| 5.6 | 0.204 | 10.9 | 0.165 | 1.9 | 0.276 | 6.5 | 0.21 | 3.16 | 0.148 |
| 5.84 | 0.61 | 11.5 | 0.44 | 2.1 | 0.71 | 6.95 | 0.485 | 3.36 | 0.341 |
| 6.05 | 0.894 | 12.5 | 0.765 | 2.3 | 0.89 | 7.37 | 0.743 | 3.79 | 0.694 |
| 6.26 | 0.996 | 13.6 | 0.93 | 2.74 | 0.98 | 7.79 | 0.805 | 4.21 | 0.777 |
| 6.47 | 1.0 | 15.6 | 0.985 | 2.95 | 1.0 | 8.21 | 0.833 | 5.05 | 0.83 |

| Run 4-11 | | Run 4-12 | | Run 4-13 | | Run 4-14 | |
|---|---|---|---|---|---|---|---|
| Ag⁺ Resin 0.1% Benzene | | Ag⁺ Resin 1% Benzene | | Ag⁺ Resin 0.1% Toluene | | Cu⁺² Resin 0.05% i-BuSH | |
| Bed Vol. | $C_E/C_F$ | Bed Vol. | $C_E/C_F$ | Bed Vol. | $C_E/C_F$ | Bed Vol. | $C_E/C_F$ |
| 12.6 | 0.15 | 2.32 | 0.055 | 12.1 | ~0 | 100 | 0.021 |
| 13.2 | 0.66 | 2.53 | 0.286 | 12.6 | 0.05 | 107 | 0.064 |
| 13.7 | 0.795 | 2.95 | 0.466 | 13.2 | 0.259 | 112 | 0.102 |
| 14.7 | 0.863 | 3.8 | 0.841 | 13.7 | 0.46 | 127 | 0.252 |
| 15.8 | 0.90 | 4.2 | 0.91 | 14.7 | 0.72 | 150 | 0.44 |
| 17.9 | 0.92 | 7.58 | 0.965 | 15.8 | 0.77 | 208 | 0.63 |

¹ $C_F$=feed concentration; $C_E$=eluent concentration.

(B) A small column containing 2.8 ml. of the macroporous cation-exchange in Li⁺ form was tested with a 1 percent solution of methanol in di-n-butyl ether. Fractions of the eluent were collected and analyzed by VPC.

Bed volumes:                                           $C_E/C_F$ 4.4 ------------------------------------- 0
9.3 ------------------------------------- 0
12.2 ------------------------------------ 0.038
13.7 ------------------------------------ 0.094
15.1 ------------------------------------ 0.241
17.4 ------------------------------------ 0.523

Selective sorption of methanol is evident.

EXAMPLE 5

Vapor phase sorption

The macroporous cation-exchange resins are effective sorbents with gaseous as well as liquid mixtures. A standard vapor-phase chromatographic (VPC) column was loaded with dry macroporous cation-exchange resin described in Example 1A in an appropriate cationic form. The column was mounted in a standard VPC unit and heated to the desired temperature while being swept with 50 ml./mm. of helium. Then 5 μl. samples of various test

TABLE 6.—VAPOR PHASE SORPTION TEST MACROPOROUS CATION-EXCHANGE RESIN

[322 m.²/g., Na⁺ form]

| Solute, B.P. ° C. | Co⁺² Resin | | Ag⁺ Resin, 139° C. |
|---|---|---|---|
| | 110° C. | 160° C. | |
| n-Pentane, 36.1° | 29 | | 29 |
| 2-pentene, 37.1° | 44 | | V. high.¹ |
| 2,3-dimethylbutane, 58.0° | 50 | | |
| Methylene chloride, 40.2° | 57.5 | | |
| Cyclohexane, 80.7° | 69 | | |
| n-Hexane, 68.7° | 91 | 17 | 72 |
| Benzene, 80.1° | 178 | 31 | V. high.¹ |
| n-Heptane, 98.4° | 342 | 36.5 | |

¹ Very strongly absorbed.

(B) With a macroporous cation-exchange resin in K⁺ form (334 m.²/g. Na⁺ form) at 140° C., acetone, n-butyl ether and methanol were strongly absorbed while n-hexane, n-heptane, ethyl ether, benzene and piperylene passed rapidly through the column.

I claim:
1. In a process for separating a polar organic species from a less polar species in a non-aqueous gaseous or liquid mixture without chemical reaction therebetween by sorption with a solid sorbent, the improvement which comprises using as the sorbent a dry macroporous ca- tion-exchange resin in hydrogen or cationic metal salt form having a specific surface area of at least 20 m.²/g. as determined by nitrogen absorption.

2. The process of claim 1 wherein the macroporous cation-exchange resin is a sulfonated macroporous polyvinylaromatic resin.

3. The process of claim 2 wherein the macroporous cation-exchange resin is in a monovalent cationic form.

4. The process of claim 3 wherein the macroporous cation-exchange resin is in H+ form.

5. The process of claim 3 wherein the macroporous cation-exchange resin is in Na+ form.

6. The process of claim 3 wherein the macroporous cation-exchange resin is in Ag+ form.

7. The process of claim 2 wherein the less polar species is a saturated hydrocarbon.

8. The process of claim 7 wherein an unsaturated hydrocarbon is separated from an aliphatic hydrocarbon through contact with a macroporous cation-exchange resin in Ag+ form.

9. The process of claim 2 wherein a gaseous mixture is separated by contact with the sulfonated macroporous polyvinylaromatic resin.

10. The process of claim 2 wherein a polar organic species selected from the group consisting of alcohols, aldehydes, ketones, ethers, mercaptans, chlorinated hydrocarbons, olefins and aromatic hydrocarbons is separated from an aliphatic hydrocarbon containing up to about 2 weight percent of said polar organic species through liquid or vapor phase contact with the dry macroporous cation-exchange resin.

References Cited

UNITED STATES PATENTS

| | | | |
|---|---|---|---|
| 3,219,717 | 11/1965 | Niles | 260—666 |
| 3,282,831 | 11/1966 | Hamm | 208—208 |
| 3,284,531 | 11/1966 | Shaw et al. | 260—677 |
| 3,315,002 | 4/1967 | Small | 260—643 |
| 2,865,970 | 12/1958 | Thomas | 260—677 |
| 3,026,362 | 3/1962 | McKeever | 260—677 |
| 3,037,052 | 5/1962 | Bortnick | 260—2.2 |
| 3,122,456 | 2/1964 | Meier et al. | 260—2.2 |
| 3,201,357 | 8/1965 | Fang et al. | 260—2.2 |
| 3,219,717 | 11/1965 | Niles | 260—666 |
| 3,282,831 | 11/1966 | Hamm | 208—208 |
| 3,284,531 | 11/1966 | Shaw et al. | 260—677 |
| 3,315,002 | 4/1967 | Small | 260—643 |

DELBERT E. GANTZ, *Primary Examiner.*

HERBERT LEVINE, *Assistant Examiner.*